(12) United States Patent
Ueda et al.

(10) Patent No.: US 8,400,282 B2
(45) Date of Patent: Mar. 19, 2013

(54) MULTI-FUNCTION VIBRATION ACTUATOR

(75) Inventors: Minoru Ueda, Tokyo (JP); Shoichi Kaneda, Tokyo (JP); Takayuki Kumagai, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 1300 days.

(21) Appl. No.: 12/158,453

(22) PCT Filed: Dec. 26, 2006

(86) PCT No.: PCT/JP2006/325825
§ 371 (c)(1),
(2), (4) Date: Jun. 20, 2008

(87) PCT Pub. No.: WO2007/074793
PCT Pub. Date: Jul. 5, 2007

(65) Prior Publication Data
US 2010/0201501 A1    Aug. 12, 2010

(30) Foreign Application Priority Data
Dec. 27, 2005   (JP) ................................. 2005-374243

(51) Int. Cl.
*H04B 3/36*   (2006.01)
(52) U.S. Cl. .................. 340/407.1; 340/683; 340/691.1; 340/691.7; 340/693.5; 340/7.6; 372/150; 372/412
(58) Field of Classification Search ............... 340/384.1, 340/407.1, 407.2; 381/150, 412
See application file for complete search history.

(56) References Cited

U.S. PATENT DOCUMENTS

| 7,187,779 B2 * | 3/2007 | Usuki et al. ................ 381/414 |
| 2002/0122560 A1 * | 9/2002 | An ................................. 381/150 |
| 2002/0131612 A1 * | 9/2002 | Son ............................... 381/150 |
| 2003/0022702 A1 * | 1/2003 | Usuki et al. ................. 455/567 |
| 2004/0075351 A1 * | 4/2004 | Ueda et al. .................... 310/81 |
| 2007/0187172 A1 * | 8/2007 | Kaneda et al. .............. 181/181 |

FOREIGN PATENT DOCUMENTS

| JP | 2001259525 A |   | 9/2001 |
| JP | 2003-300014 A |   | 10/2003 |
| JP | 2004320399 A |   | 11/2004 |
| KR | 2004066064 A | * | 7/2004 |
| WO | 2005084073 A1 |   | 9/2005 |

OTHER PUBLICATIONS

International Search Report for PCT/JP2006/325825, mailed Feb. 27, 2007 from the Japanese Patent office.

* cited by examiner

*Primary Examiner* — Brian Zimmerman
*Assistant Examiner* — Sara Samson
(74) *Attorney, Agent, or Firm* — Studebaker & Brackett PC; Donald R. Studebaker

(57) ABSTRACT

A magnetic circuit including a pole piece, a magnet, and a yoke is supported by using a suspension where outer and inner circumferential portions thereof are connected to each other with a supporting member, and the outer circumferential portion of the suspension is fixed to protrude from a housing or an inner wall of a cover provided with a stepped portion in a direction passing over the magnetic circuit toward an inner portion, so that it is possible to limit a movable range of the magnetic circuit by using the outer circumferential portion of the suspension and to prevent inner components of a main body of the multi-function vibration actuator from being destructed at the time of being impacted due to falling.

10 Claims, 4 Drawing Sheets

MULTI-FUNCTION VIBRATION ACTUATOR

TECHNICAL FIELD

The present invention relates to a multi-function vibration actuator having a vibration generating function and a speaker function in one body, built in a mobile phone or a miniaturized portable electronic apparatus.

RELATED ART

Recently, some mobile communication apparatuses such as a mobile phone have a sound releasing means for notifying a user of receiving of a call signal with sound and a vibration generating means for notifying the user of receiving of the call signal with vibration in a "manner" mode.

Conventionally, in such a mobile communication apparatus, a vibration generator for generating vibration and a speaker for reproducing sound are provided as separate components. However, recently, a multi-function vibration actuator having a vibration generating function and a sound reproducing function in one body by sharing a magnetic circuit unit is used.

In Japanese Patent No. 3291468 (hereinafter, referred to as Patent Document 1), there is disclosed a multi-function vibration actuator provided with a stopper mechanism for preventing destruction of a magnetic circuit unit in the multi-function vibration actuator at the time of a mobile apparatus having the multi-function vibration actuator being impacted due to falling.

Similarly to a conventional multi-function vibration actuator, in the multi-function vibration actuator disclosed in Patent Document 1, vibration is generated by a magnetic force mutually exerted between a voice coil fixed to a diaphragm and a magnetic circuit supported through an elastic member toward an inner portion of a housing.

In a sound reproducing period, in order to release the sound, only the diaphragm is vibrated by inputting a sound frequency of 150 to several tens kHz that is a resonance frequency of the diaphragm into the voice coil. In a vibration generating period, in order to generate sensible vibration, only the magnetic circuit is vibrated by inputting a low frequency of 10 to 150 Hz that is a resonance frequency of the magnetic circuit as a driving signal into the voice coil.

In addition to the sound reproducing function and the vibration generating function of the conventional multi-function vibration actuator, the multi-function vibration actuator disclosed in Patent Document 1 is provided with a stopper for preventing destruction of internal components at the time of being impacted due to falling.

More specifically, in order to limit a movable range of the magnetic circuit, a protrusion is provided to an inner wall of the housing with respect to an impact to a voice coil, and a protrusion is provided to a central portion of the cover with respect to an impact to the cover. Therefore, the magnetic circuit can be prevented from being in contact with relatively destructible components such as a voice coil.

According to Patent Document 1, the movable range of the magnetic circuit can be limited by the inner-wall protrusion of the housing and the cover-side protrusion, so that it is possible to prevent the magnetic circuit from destructing the inner components at the time of being impacted due to falling.

In addition, a weight member is provided to an outer circumferential portion of the magnetic circuit, so that it is possible to increase a vibration amplitude and to generate sufficiently sensible vibration that can be sensed by a user.

In comparison with conventional multi-function vibration actuators, the multi-function vibration actuator disclosed in Patent Document 1 has an advantage at the time of being impacted due to falling. However, the multi-function vibration actuator disclosed in Patent Document 1 still has a problem in impact absorption of the cover due to its structure.

In the multifunction vibration actuator disclosed in Patent Document 1, since the protrusion provided to the central portion of the cover receives the impact on the cover, the cover and the suspension provided to an opening of the housing and the magnetic circuit supported by the suspension may be separated from the housing.

In addition, since the weight member and the yoke are separately provided, the number of assembling steps is increased, so that production cost is increased.

In order to solve the aforementioned problems, a multi-function vibration actuator is disclosed in Japanese Patent Application Laid-Open No. 2000-333282 (hereinafter, referred to as Patent Document 2).

In Patent Document 2, protrusions the same as that of Patent Document 1 are provided to two portions, that is, upper and lower portions of a magnetic circuit.

In Patent Document 2, since a protrusion is provided to an inner wall of a housing, destruction of inner components can be prevented at the time of being impacted due to falling without a load exerted to the cover unlike Patent Document 1.

In addition, due to the protrusion provided to the inner wall of the housing, internal air flow resistance between the inner wall of the housing and the magnetic circuit which is generated at the time of vibration of the magnetic circuit can be suppressed by using a hole or a cut portion formed in the protrusion, and stable vibration characteristics can be obtained.

In addition, in Patent Document 2, due to the protrusion provided to the housing, the movable range of the magnetic circuit can be limited. Therefore, there is no need to block an opening of the housing opposite to a diaphragm with the cover. Accordingly, it is possible to reduce the number of production steps and to lower production cost.

In addition, in Patent Document 2, the weight member and the yoke are integrally formed, so that it is possible to reduce the number of components and to prevent the weight member from being separated from the yoke at the time of being impacted. Accordingly, it is possible to implement the multi-function vibration actuator with a lower number of components and to prevent destruction of a main body or inner components of the multi-function vibration actuator at the time of being impacted.

However, in the multi-function vibration actuator disclosed in Patent Document 2, since stoppers are provided to upper and lower portions of the housing, there is a problem in that the housing needs to be portioned into upper and lower portions thereof.

In addition, in order to decrease the air flow resistance generated at the time of driving the magnetic circuit, the stopper formed as the protrusion needs to be formed by cutting. Therefore, the stopper may weaken in strength.

In order to solve the aforementioned problems, an object of the present invention is to provide a multi-function vibration actuator capable of preventing destruction thereof at the time of being impacted due to falling and capable of being easily assembled with a simple structure.

In order to solve the problems, there is provided a multi-function vibration actuator comprising: a magnetic circuit having a plate-shaped magnet magnetized in a thickness direction, a pole piece made of a plate-shaped magnetic material and attached on the one surface of the magnet, and a yoke made of a magnetic material and attached on the other surface of the magnet so as to form a magnetic gap between an end of the pole piece and the yoke; a housing having a substantially cylindrical shape and accommodating the magnetic circuit; a suspension supporting the magnetic circuit toward an inner wall of the housing; a diaphragm blocking the one opening of the housing; and a coil attached to the diaphragm and disposed in the magnetic gap, the magnetic circuit or the diaphragm being vibrated by applying an alternating current to the coil, the other opening of the housing being blocked by a cover, wherein the suspension has a structure where circular-ring-shaped inner and outer circumferential portions are connected to each other with a supporting member, and wherein the outer circumferential portion is formed to protrude in a direction passing across an outer circumference of the magnetic circuit toward a center of the housing.

According to the invention the cover is provided with a stepped portion and has a cylindrical shape where one opening is blocked, and the outer circumferential portion of the suspension which supports the magnetic circuit through the inner circumferential portion is disposed between the cylindrical housing and the stepped portion of the cover.

Further, the suspension is made of a magnetic material, and the suspension is disposed on a circumferential portion of the magnetic circuit so that an inner surface of the inner circumferential portion of the suspension constitutes the one end of the magnetic gap.

Additionally, the cover or the housing is provided with a through-hole.

Still further, an outer circumferential portion of the diaphragm provided with the coil is inserted between the housing and the grill having an outer circumferential portion in a substantially circular plate shape.

Also a gap may be provided between an outer circumferential surface of the magnetic circuit and an inner-wall surface of the cover or the cylindrical housing is in a range of 0 to 2.5% of an inner-wall radius of the housing or the cover.

According to the invention it is possible to limit a movable range of the magnetic circuit without a protrusion as an additional stopper being provided to an inner wall of the housing.

Unlike conventional multi-function vibration actuators where the limitation to the movable range of the magnetic circuit and the elastic supporting for the magnetic circuit inward the housing are performed by using separate components, in the multi-function vibration actuator according to the present invention, the limitation and the elastic supporting are preformed by using one component. More specifically, the outer circumferential portion of the suspension having the outer and inner circumferential portions is formed to protrude from the housing, so that it is possible to prevent the voice coil and the like from being destructed due to contact of an outer circumferential portion of the magnetic circuit with the outer circumferential portion of the suspension at the time of being impacted due to falling.

Therefore, there is no need to provide a separate protrusion to an inner portion of the housing, so that it is possible to limit the movable range of the magnetic circuit without the magnetic circuit being in contact with the supporting member connecting the outer and inner circumferential portions of the suspension.

In addition, since a strength of the stopper can be changed by an area of the outer circumferential portion of the suspension protruding from the housing, it is possible to easily obtain a strength required for resisting the impact.

Since the cover is provided with the stepped portion and the outer circumferential portion is fixed to the stepped portion, the movable range of the magnetic circuit toward the cover can be limited by the bottom of the cover. Therefore, when the movable range of the magnetic circuit is to be limited, only the movable range toward the diaphragm may be limited. Therefore, the movable range of the magnetic circuit may be limited by using only the outer circumferential portion of the suspension.

Further, since the suspension is made of a magnetic material, it is possible to improve magnetic efficiency in the state that a total thickness of the multi-function vibration actuator is not increased.

Also, since the housing or the cover is provided with the through-hole, it is possible to improve sound characteristics.

Additionally, since the outer circumferential portion of the diaphragm is inserted and fixed between the housing and the grill, it is possible to improve a fixing strength of the diaphragm with respect to the housing and the like and to protect the diaphragm from impact at the time of falling.

Still further, since the gap between the outer circumferential surface of the magnetic circuit and the inner-wall surface of the cover or the housing is set to be in a range of 0 to 2.5% of the inner-wall radius of the housing or the cover, it is possible to limit an amount of air flow in upper and lower spaces interposing the magnetic circuit and to use the air as a damper.

Unlike the multi-function vibration actuator disclosed in Patent Document 2, in the multi-function vibration actuator disclosed herein, due to the aforementioned structure, there is no need to reduce air flow resistance at the time of vibration, so that it is possible to obtain a stable vibration characteristic without a decrease in a strength of the stopper.

BRIEF DESCRIPTION OF THE DRAWINGS

FIGS. 1 and 2 are a cross-sectional side view and an exploded perspective view illustrating a multi-function vibration actuator according to a first embodiment of the present invention, and FIG. 3 is a plan view illustrating a suspension used for the multi-function vibration actuator.

As shown in FIGS. 1 to 3, a multi-function vibration actuator according to the embodiment comprises a magnetic circuit including a pole piece 6, a magnet 7, and a yoke 8, a suspension 9 which is made of a magnetic material and supports the magnetic circuit toward a cover 1 by using an inner circumferential portion B, a housing 2 which fastens the suspension 9 interposed between the housing and the cover 1, a diaphragm 4 which is fixed on the housing 2, a voice coil 5 fastened on the diaphragm 4, a grill 3 which is disposed on the diaphragm 4, and a terminal 10 which is electrically connected to the voice coil 5.

Referring to FIGS. 1 and 2, in the multi-function vibration actuator according to the embodiment, sound releasing holes H are provided to the cover 1, so that sound characteristics can be improved. In addition, a gap G between the magnetic circuit and the cover 1 shown in FIG. 1 is set to be 2.5% or less of an inner-wall radius of the cover 1, so that an amount of air flow in a space V under a lower portion of the magnetic circuit can be limited. Accordingly, the magnetic circuit can be stably driven.

The yoke 8 has a structure where the yoke and a weight member are integrally formed. Therefore, it is possible to reduce the number of components and to prevent the weight member from being separated from the yoke at the time of being impacted due to falling.

Figure 1:
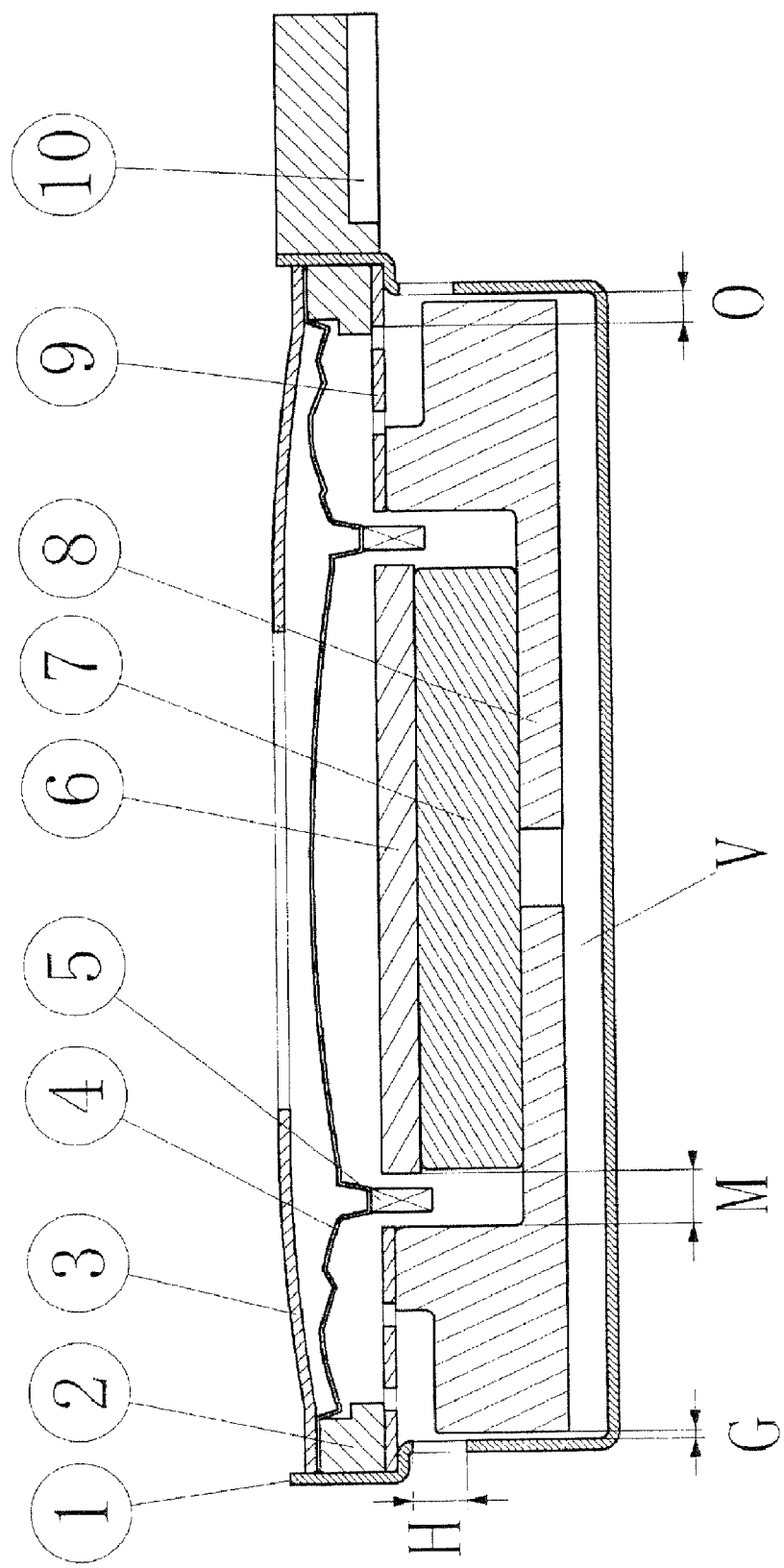
FIG. 1 is a side cross-sectional view illustrating a multi-function vibration actuator according to an embodiment of the present invention.
Figure 2:
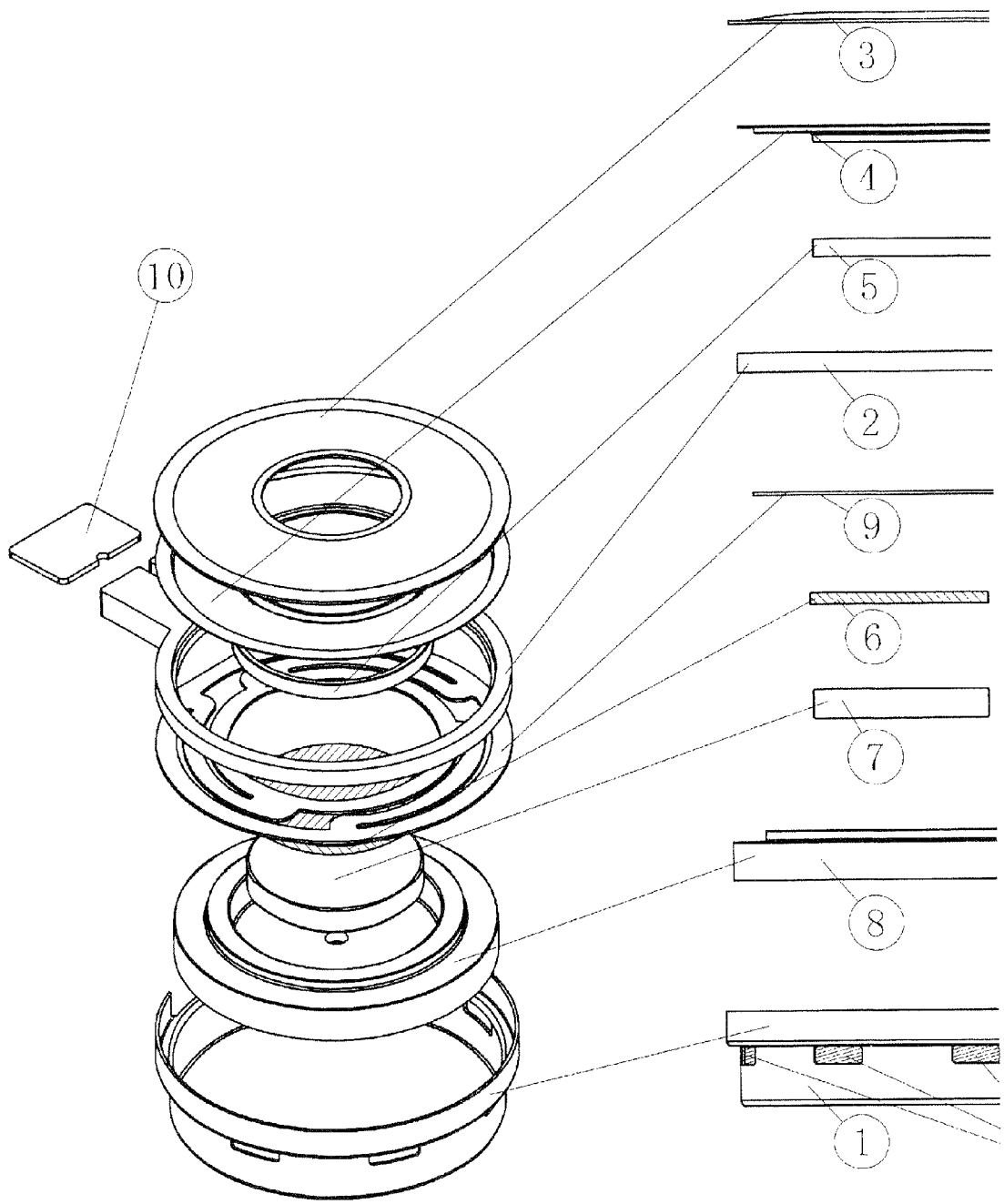
FIG. 2 is an exploded perspective view illustrating the multi-function vibration actuator according to the embodiment of the present invention.
Figure 3:
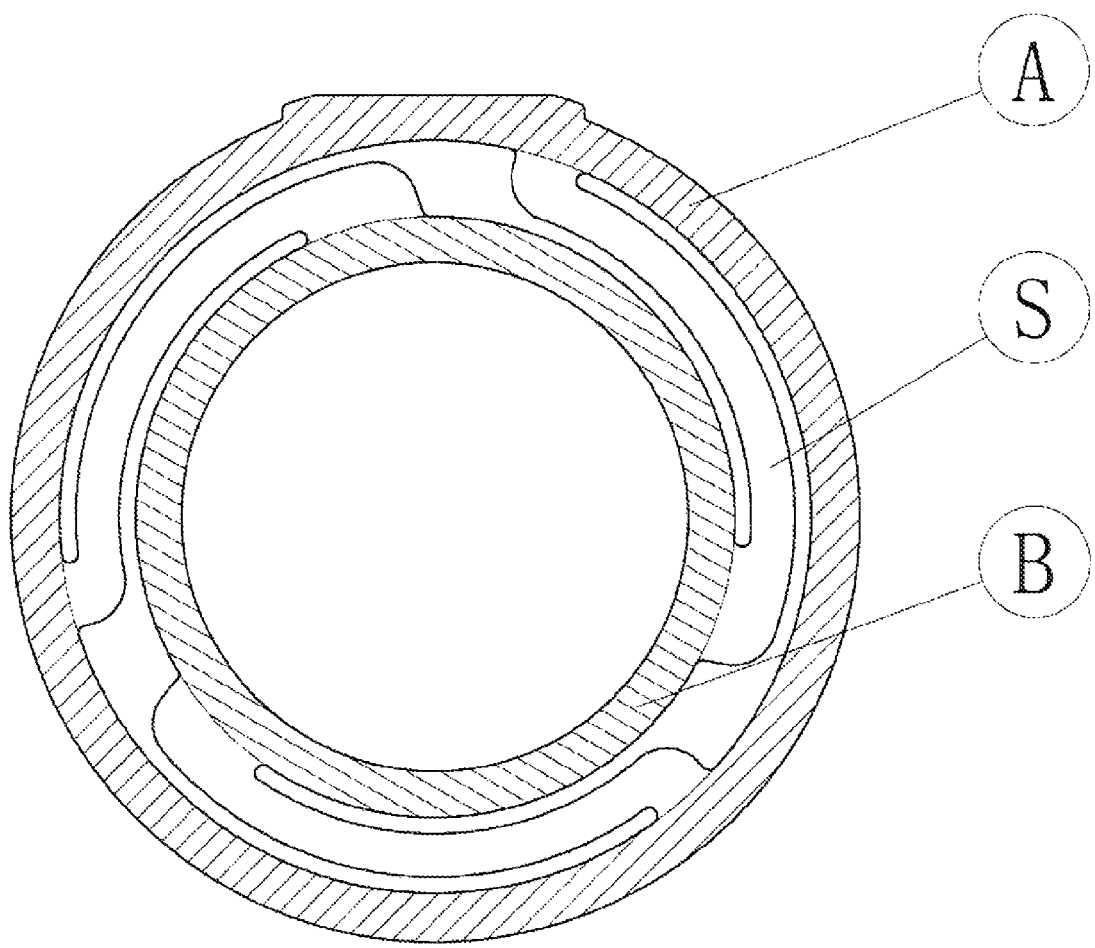
FIG. 3 is a plan view illustrating a suspension used in the embodiment of the present invention.

Referring to FIG. 1, in the embodiment, the suspension 9 is fixed so as to form a protrusion O protruding from the cover 1, and an outer circumferential portion A of the suspension is fixed to the cover 1 by the housing 2.

Therefore, in the multi-function vibration actuator according to the embodiment, it is possible to prevent the magnetic circuit from being in contact with the diaphragm 4 and the voice coil 5 at the time of being impacted due to falling. In addition, since the outer circumferential portion A of the suspension is reinforced by the housing 2, it is possible to prevent the outer circumferential portion A from being deformed due to an excessive impact.

In addition, according to the embodiment, the suspension 9 is made of a magnetic material, and a magnetic gap M is formed between a side surface of the pole piece 6 and the suspension through the yoke 8 made of a magnetic material and disposed therebetween, so that it is possible to improve magnetic efficiency.

Figure 4:
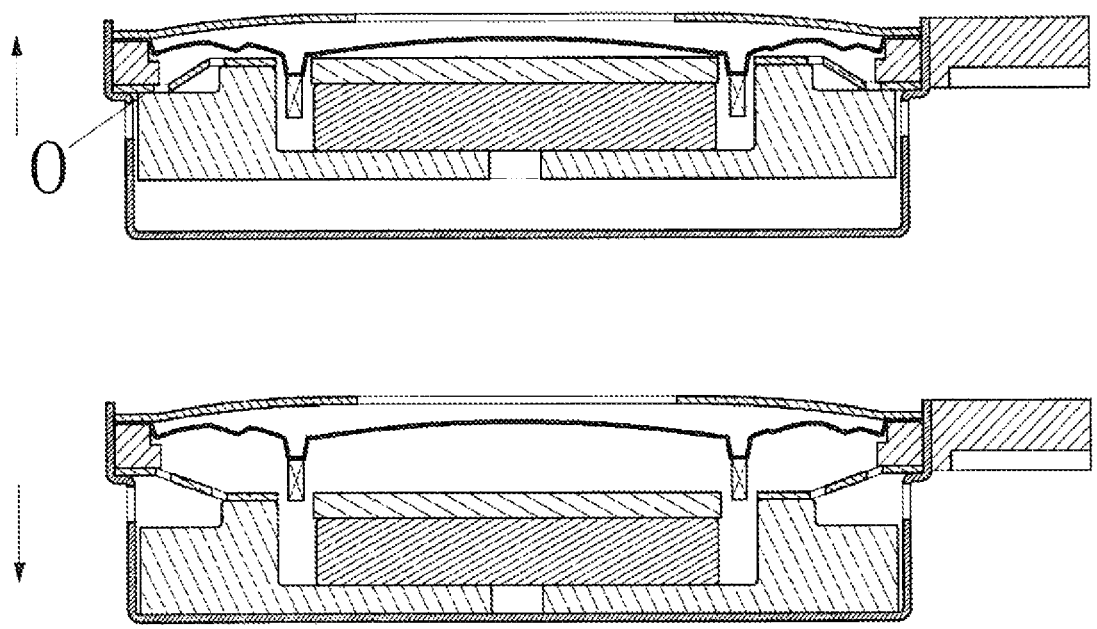
FIG. 4 is a view illustrating a movable range of a magnetic circuit of the multi-function vibration actuator according to the embodiment of the present invention.

In addition, since an opening is provided to only one side of the cover 1 and the other side is blocked by the diaphragm 4 and the grill 3, the movable range of the magnetic circuit can be limited between the protrusion O of the suspension 9 and a bottom of the cover 1 as shown in FIG. 4. Therefore, it is possible to prevent internal components from being destructed and deformed at the time of being impacted due to falling, without an additional protrusion provided in an inner portion of the cover 1.

In addition to the aforementioned advantages, according to the embodiment, an outer circumferential portion of the diaphragm 4 is interposed and fixed between the grill 3 attached to the cover 1 and the housing 2, so that it is possible to improve a fixing strength of the diaphragm 4.

As described above, according to the embodiment, it is possible to provide a multi-function vibration actuator having a good impact resistance at the time of being impacted due to falling and a simple structure capable of being easily assembled.

The invention claimed is:

1. A multi-function vibration actuator comprising:
    a magnetic circuit having a plate-shaped magnet magnetized in a thickness direction, a pole piece made of a plate-shaped magnetic material and attached on the one surface of the magnet, and a yoke made of a magnetic material and attached on the other surface of the magnet so as to form a magnetic gap between an end of the pole piece and the yoke;
    a housing having a substantially cylindrical shape and accommodating the magnetic circuit;
    a suspension supporting the magnetic circuit toward an inner wall of the housing;
    a diaphragm blocking the one opening of the housing; and
    a coil attached to the diaphragm and disposed in the magnetic gap, the magnetic circuit or the diaphragm being vibrated by applying an alternating current to the coil, the other opening of the housing being blocked by a cover,
    wherein the suspension has a structure where circular-ring-shaped inner and outer circumferential portions are connected to each other with a supporting member, and
    wherein the outer circumferential portion is formed to protrude from the cover in a direction passing across an outer circumference of the magnetic circuit toward a center of the housing.

2. The multi-function vibration actuator according to claim 1,
    wherein the cover is provided with a stepped portion and has a cylindrical shape where one opening is blocked, and
    wherein the outer circumferential portion of the suspension which supports the magnetic circuit through the inner circumferential portion is disposed between the cylindrical housing and the stepped portion of the cover.

3. multi-function vibration actuator according to claim 1,
    wherein the suspension is made of a magnetic material, and
    wherein the suspension is disposed on a circumferential portion of the magnetic circuit so that an inner surface of the inner circumferential portion of the suspension constitutes the one end of the magnetic gap.

4. The multi-function vibration actuator according to claim 1, wherein the cover or the housing is provided with a through-hole.

5. The multi-function vibration actuator according to claim 1, wherein an outer circumferential portion of the diaphragm provided with the coil is inserted between the housing and the grill having an outer circumferential portion in a substantially circular plate shape.

6. The multi-functional vibration actuator according to claim 1, wherein a gap between an outer circumferential portion of the magnetic circuit and an inner-wall surface of the cover or the cylindrical housing is in a range of 0 to 2.5% of an inner-wall radius of the housing or the cover.

7. The multi-function vibration actuator according to claim 2,
    wherein the suspension is made of a magnetic material, and
    wherein the suspension is disposed on a circumferential portion of the magnetic circuit so that an inner surface of the inner circumferential portion of the suspension constitutes the one end of the magnetic gap.

8. The multi-function vibration actuator according to claim 2, wherein the cover or the housing is provided with a through-hole.

9. The multi-function vibration actuator according to claim 2, wherein an outer circumferential portion of the diaphragm provided with the coil is inserted between the housing and the grill having an outer circumferential portion in a substantially circular plate shape.

10. The multi-functional vibration actuator according to claim 2, wherein a gap between an outer circumferential portion of the magnetic circuit and an inner-wall surface of the cover or the cylindrical housing is in a range of 0 to 2.5% of an inner-wall radius of the housing or the cover.

* * * * *